Aug. 16, 1927. 1,639,421
H. J. BARNHART
STEAM SHOVEL
Filed Sept. 10, 1921 2 Sheets-Sheet 1

Harry J. Barnhart INVENTOR.
BY
Edwin P. Corbett
ATTORNEY.

Aug. 16, 1927.

H. J. BARNHART 1,639,421

STEAM SHOVEL

Filed Sept. 10, 1921

2 Sheets-Sheet 2

Harry J. Barnhart
INVENTOR.

BY
Edwin P. Corbet
ATTORNEY.

Patented Aug. 16, 1927.

1,639,421

UNITED STATES PATENT OFFICE.

HARRY J. BARNHART, OF MARION, OHIO, ASSIGNOR TO THE OSGOOD COMPANY, OF MARION, OHIO, A CORPORATION OF OHIO.

STEAM SHOVEL.

Application filed September 10, 1921. Serial No. 499,797.

My invention relates to steam shovels and has particular application to the type of steam shovel generally known as an endless chain traction type for the reason that the traction units are in the form of endless belts which give a prolonged frictional contact with the ground in impelling the steam shovel thereover. It has to do particularly with the provision of a ready and effective means for steering steam shovels of this type, particularly in their passage along a road to or from a job.

Steam shovels are ordinarily of a heavy construction and this very weight somewhat enhances the difficulty of providing a steering means that will be positive and certain in its action and that will not be unnecessarily costly. I have provided such a construction by using an independently movable clutch for each traction unit in conjunction with a novel type of locking dog.

My locking dog is so constructed and so cooperative with its movable clutch element that it will serve to lock this clutch in driving position or out of driving position in an effective and yet simple manner. It not only acts to lock the movable clutch element in either position to which it is adjusted but it also serves effectively to lock this clutch against rotation with the ultimate result of positively stopping the idle movement of the particular traction unit so that it becomes possible to turn the steam shovel in a much shorter distance and space of time.

Another phase of my invention results from the fact that the locking dog which I use is particularly constructed to facilitate its manipulation by a pinch bar or similar tool. Thus, the locking dog may be subjected to ample force at any time to release it from any position in which it may have become jammed.

Figure 1:
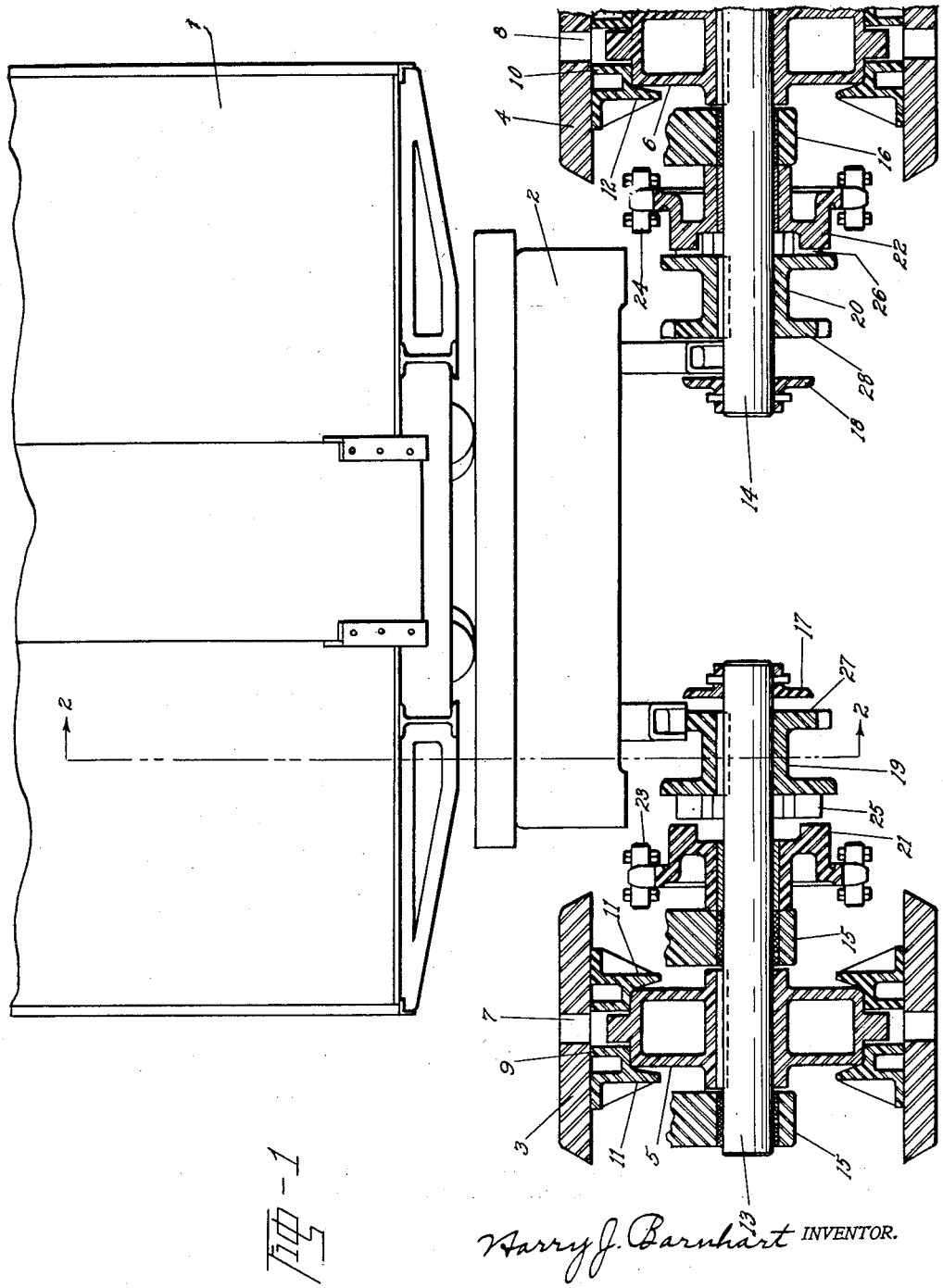

The preferred embodiment of my invention is shown in the accompanying drawings wherein similar characters of reference designate corresponding parts and wherein Figure 1 is a front elevation of the body portion of my steam shovel, the traction unit, however, being shown in section and shown equipped with my locking dog.

Figure 2:
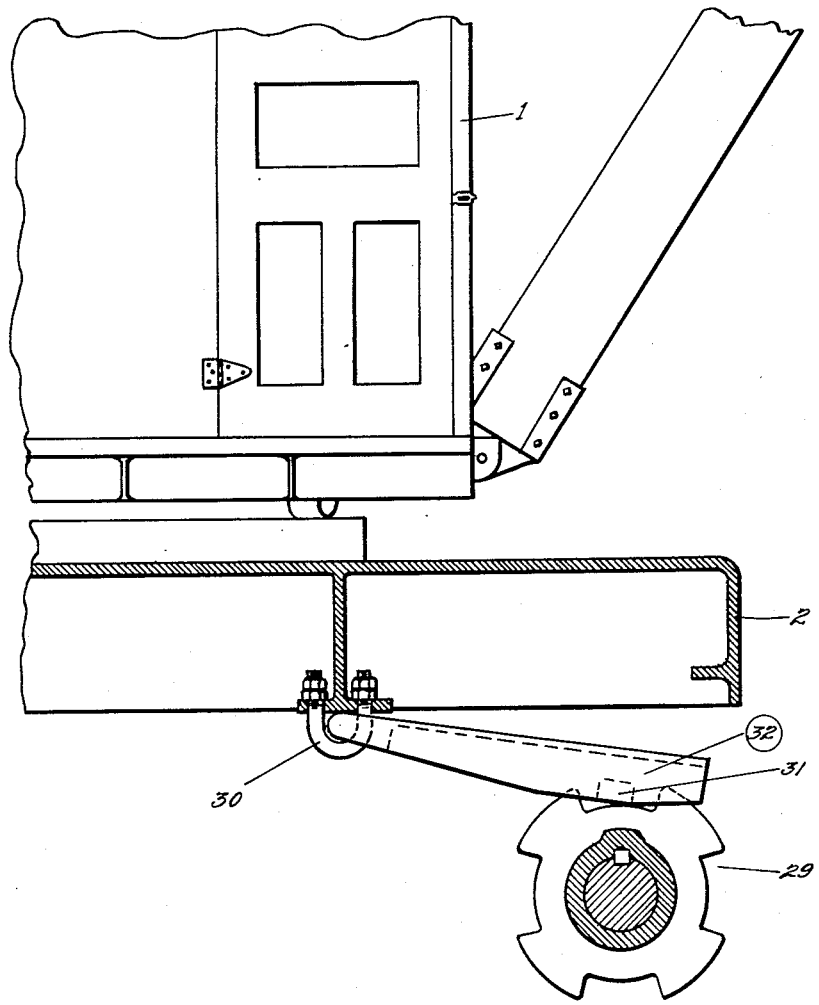

Figure 2 is a section taken on line 2—2 of Figure 1 illustrating my locking dog in effective position to lock the movable clutch element out of driving position and against rotation.

In the drawings, my steam shovel is shown as having a body portion 1 mounted upon a truck frame 2. These parts are merely represented generally for it will be understood that my locking dog may be applied to practically any type of endless chain steam shovel construction. The endless chain tractor units are also represented generally at 3 and 4 in Figure 1.

The endless chain units are desirably mounted to travel around a series of chilled steel rolls in a well known manner and are driven by means of sprockets 5 and 6 having teeth 7 and 8 extending into sockets 9 and 10 in the tread members of the traction unit. These tread members are also provided with inwardly extending flanges 11 and 12 which serve as guides both upon the sprockets 5 and 6 and upon the chilled steel rollers which are not shown.

The sprockets 5 and 6 are respectively keyed to shafts 13 and 14 supported from the truck frame by bearing members 15 and 16 and these shafts are provided at their inner ends with stop collars 17 and 18. Likewise keyed upon shafts 13 and 14 are movable clutch members 19 and 20 which are adjustable into and out of cooperative relation to positively driven sprockets 21 and 22 which are mounted to rotate upon the shafts 13 and 14 under the impetus of sprocket chains 23 and 24.

Each of the movable clutch elements 19 and 20 is in the form of a collar having jaw teeth 25 and 26 upon the outer surfaces thereof and having inner flange members 27 and 28 upon the inner ends thereof. These flange members 27 and 28 are cut away at several places as shown at 29 in Figure 2.

My locking dog is swung from the truck frame as shown in Figure 2 by means of a U-bolt 30 within which one end of the dog is loosely mounted to swing. The dog itself, in its main body portion, is U-shaped in cross-section and is provided adjacent its forward end with a cross pin 31, this cross pin being preferably integral. The construction and placing of the pin 31 is such as to provide a channel 32 between the upper surface of this pin and the upper wall of the dog interior.

The operation of this apparatus is illustrated best in Figure 1. On the right hand side of this figure, the movable clutch member is in cooperative relation with the jaw teeth on the sprocket member 22 and is held in this cooperative relation by the interposition of the dog between the flange 28 of the movable clutch member and the collar 18. In this position, the rotation of the positively driven sprocket 22 is transmitted through the movable clutch member to the shaft 14 with the result that the sprocket 6 and its traction unit is being positively driven. When it it desired to release this traction unit from positive drive, a pinch bar is inserted in the space 32 of the locking dog and this locking dog is lifted. Then, the movable clutch member is forced over into the position shown at the left hand side of Figure 1. In this position, the jaw teeth of the movable clutch member 19 are out of cooperative relation with the positively driven sprocket 21 and the locking dog rests upon and embraces the flange member 27. The result is that this traction unit is not positively driven and, on the contrary, is locked against any movement whatever by means of the pin 31 fitting in one of the cutaway portions 29 of this flange 27. Furthermore, the walls of the dog so embrace the flange 27 that this dog will not be accidentally displaced from the flange member.

It will be understood that my invention may take other forms without departing from the principle of the device herein shown and that I claim the right to all equivalents of the structure to be defined in the appended claims. Obviously, I have provided a simple and rigid structure that may be produced at a minimum cost and that will be positive and efficient in action.

Having thus described my invention, what I claim is:

1. A steering device for steam shovels of the endless chain type comprising traction units, driving mechanism for each of said units including a clutch member provided with a flange having cut away portions about its periphery thereof adapted to be moved into or out of operative engagement with said mechanism, and a locking dog provided with a pin at its lower end movably mounted upon the steam shovel frame adapted to engage a cut away portion of said clutch member to lock the same in its inoperative position and against rotation.

2. An attachment for steam shovels comprising a movable clutch member, and a locking dog for holding said clutch member in either operative or inoperative position and constructed to embrace a portion of said clutch member to prevent lateral movement thereof.

3. A steering device for steam shovels of the endless chain type comprising means for connecting either of the traction units thereof or for disconnecting either comprising a movable clutch member, and a dog for locking said clutch member in either operative or inoperative position and constructed to embrace a portion of said clutch member to prevent lateral movement of the clutch member or lateral slipping of the dog therefrom.

4. An attachment for steam shovels comprising a movable clutch member, and a locking dog for holding said clutch member in either operative or inoperative position and constructed to embrace a portion of said clutch member to prevent lateral movement thereof, said locking dog having a longitudinal opening therein for the reception of an operating tool.

In testimony whereof I hereby affix my signature.

HARRY J. BARNHART.